T. B. FERGUSON.
LIQUID FUEL BURNER.
APPLICATION FILED MAR. 2, 1918.
1,324,343.
Patented Dec. 9, 1919.
3 SHEETS—SHEET 1.
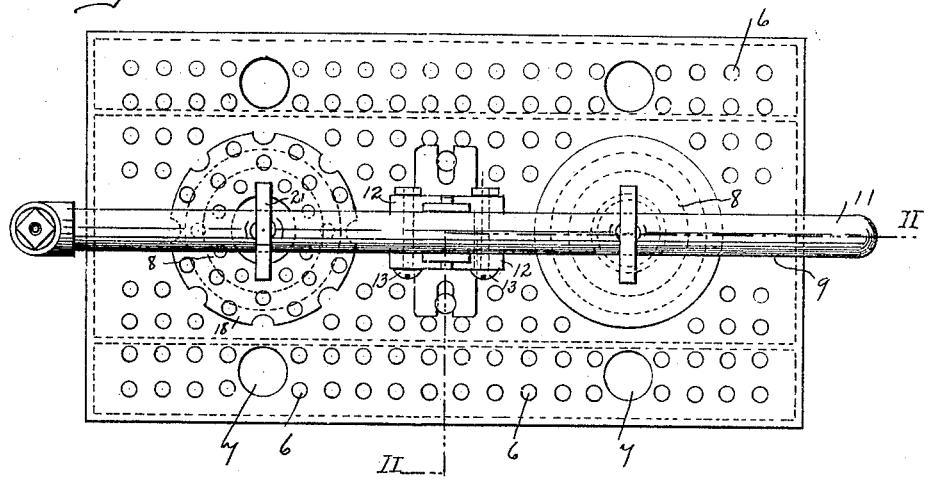
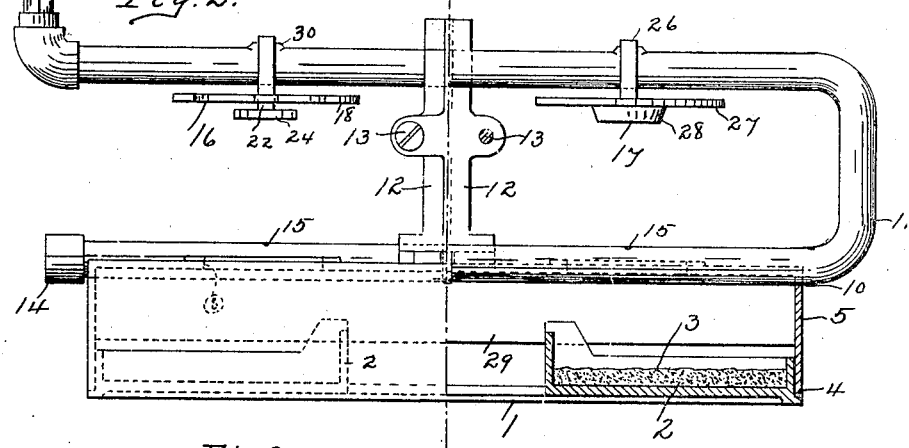
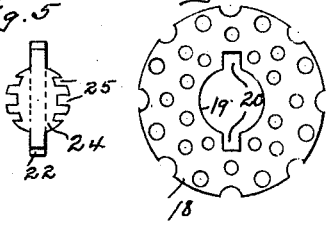
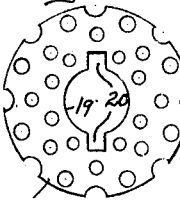
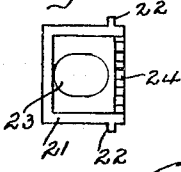
Thomas B. Ferguson
INVENTOR.
BY
Louis M. Sanders ATTORNEYS.

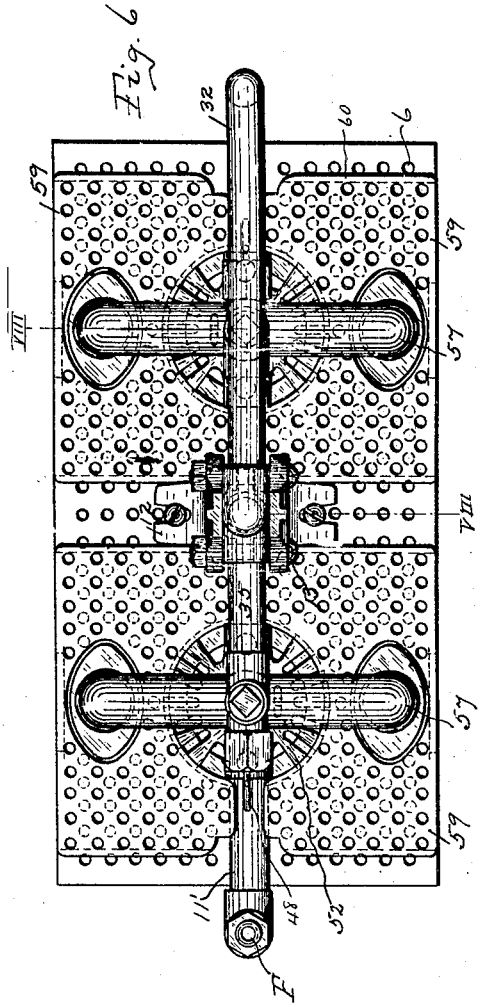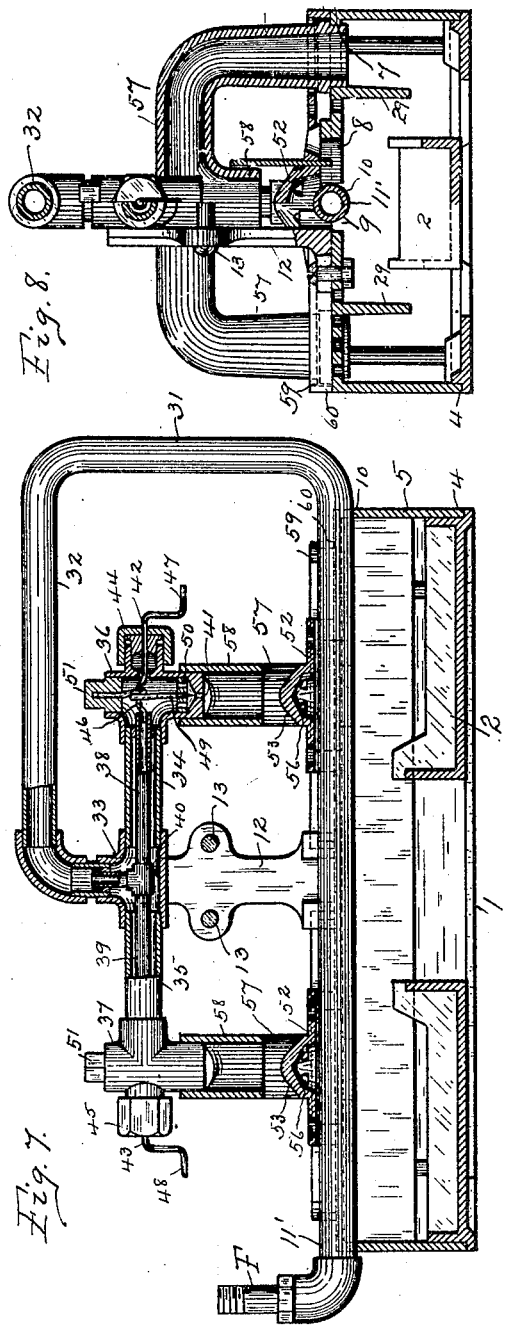

T. B. FERGUSON.
LIQUID FUEL BURNER.
APPLICATION FILED MAR. 2, 1918.
1,324,343.
Patented Dec. 9, 1919.
3 SHEETS—SHEET 3.
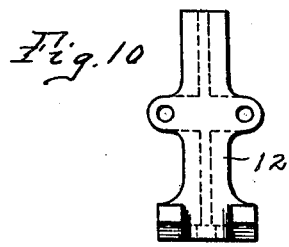
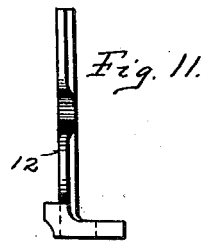
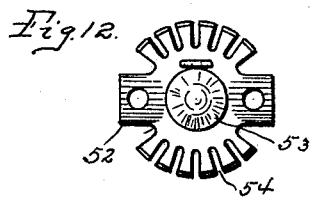
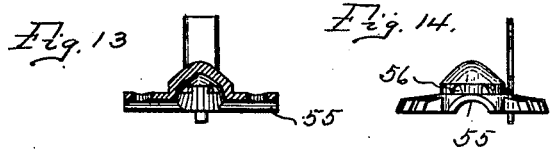
Thomas B. Ferguson
INVENTOR.
BY
Louis M. Sanders ATTORNEYS.

UNITED STATES PATENT OFFICE.

THOMAS B. FERGUSON, OF NEWARK, NEW JERSEY, ASSIGNOR TO STANDARD STOVE & LIGHT COMPANY, A CORPORATION OF NEW JERSEY.

LIQUID-FUEL BURNER.

1,324,343.  Specification of Letters Patent.  Patented Dec. 9, 1919.

Application filed March 2, 1918. Serial No. 219,957.

*To all whom it may concern:*

Be it known that I, THOMAS B. FERGUSON, a citizen of the United States, residing in the city of Newark, county of Essex, and State of New Jersey, have invented certain new and useful Improvements in Liquid-Fuel Burners, set forth in the annexed specification.

The object of my invention is to provide a liquid fuel burner, for burning kerosene oil, gasolene, or other hydro-carbon fuels, and adapted for use in the fire box of the ordinary kitchen range, whereby it may serve to furnish heat for cooking, baking, etc. It is well known that when the hydro-carbon oils are vaporized and mixed with a proper amount of air, an intensely hot blue frame may be produced. It is also known that the best results in the way of mixing the gasified fuel with air can be obtained, by heating both fuel and air prior to their ignition, and maintaining such heated condition at a temperature as nearly as possible to that of the flame produced. Otherwise imperfect combustion results, with an accompanying deposit of soot or lampblack which makes periodical cleaning of the parts necessary.

In carrying out my invention I make use of the structures as set forth in the following detailed description, and illustrated in the accompanying drawings, wherein:

Figure 1, is a plan view of one form of my invention.

Fig. 2, is a side elevation partly in section along the line II—II of Fig. 1.

Fig. 3, is a plan view of one form of deflector.

Fig. 4, is a side view of the deflector saddle.

Fig. 5, is a bottom plan view of the saddle.

Fig. 6, is a plan view of the burner adapted for a downwardly directed jet.

Fig. 7, is a vertical longitudinal section of the same.

Fig. 8, is a section on line VIII—VIII of Fig. 6.

Figs. 9, 10 and 11 are respectively a plan, a front and a side elevation of the clamp used in both forms of my invention.

Figs. 12, 13 and 14 are respectively a plan, a section and a side elevation of the deflector used in connection with the structure illustrated in Figs. 6, 7, and 8.

Similar reference numerals refer to like parts throughout the specification and drawings.

In Figs. 1 to 5, I have shown the simpler form of my invention, in which the fuel jet is projected upwardly. It consists of the base 1, provided with the primary heating pans or reservoirs 2, cast integral therewith and in which sand or asbestos 3, is placed. The margin of the base 1, is provided with a ledge or shoulder 4, which serves as a rest or stop for the air chamber 5, which latter is fitted over the base in such a manner as to form a rectangular box of a size convenient for insertion into the fire box of the ordinary cooking range. The top of the chamber 5, is provided with numerous small perforations 6, the apertures 7, and the larger apertures 8. The longitudinal slot 9, extends the entire length of the top of the chamber, with the semi-circular notches 10 in the end walls thereof. In the slot 9, and resting in the notches 10 is the lower section of the U-shaped fuel pipe 11, the upper section of which lies in a vertical plane immediately above and parallel to the top of the chamber 5. The pipe 11 is rigidly secured in place by the brackets 12 which are bolted to the top of the chamber 5, and extend upwardly to embrace both sections of the pipe 11. Clamping bolts 13 connect the brackets 12 and firmly grip the pipe in place. The free end of the lower section of the pipe 11 is closed by the cap 14, while the other end of the pipe 11 has the small fuel pipe F, connected to it and leading to a distance to a suitably located fuel reservoir, (not shown). The lower section of the pipe 11 has two jet openings 15, 15, respectively located in the upper side and at the centers of the large apertures 8, and in position to direct a jet of flame toward the upper section of the pipe. Immediately above the jet openings, and suspended from the upper section of the pipe 11, are the deflectors 16, and 17. The deflector 16 is made up of the perforated disk 18, having the enlarged central opening 19, with the diametrical slots 20, 20, and the saddle 21, by which the deflector is suspended. The saddle is generally rectangular in shape, and of a size to fit into the slots 20, with the ends of said slots resting upon the projections 22, upon the ends of the saddle. The opening 23, is provided in the saddle, through which opening the pipe 11 is passed. The bottom of the saddle is a disk 24, with its circumference slashed with a number of slots 25; its diameter is substantially the same as that of the opening 19, in the disk 18. When in place the disk 24 is slightly below the plane of the disk 18.

The deflector 17 is composed of the saddle 26, substantially the same as 21, but having the imperforate disk 27 supported therefrom. The boss 28 is located upon the under face of the disk 27.

I have found in practice that a perfect mixture of gasified liquid fuel will give a blue flame which is intensely hot, while an imperfect mixture, or a mixture containing a greater percentage of gas, will produce a more or less yellowish flame of less intense heat. It is also true that to form a more perfect mixture it is better to break up the jet of flame, cause it to spread out in numerous pencils, and then cause heated air to meet, surround and unite with the pencils of flame at the points of combustion. The purpose therefore of the deflectors 16 and 17, is to produce the proper relations of the air and gas in order that the desired mixture may be obtained. The jet as it rises from the opening 15, impinges upon the center of the disk 24, and is spread laterally continuing through the slots 25, to be met with a downward current of air through the opening 19; upon uniting the mixture spreads out beneath the disk 18, with further air addition to feed the flame coming through the numerous perforations in the disk.

With the deflector 17, the jet impinges upon the boss 28, which causes the flame to spread to meet a current of air which curls over the edge of and runs along the under side of the disk 27, which latter is of fire brick or other refractory material. A less perfect mixture is thus produced with a resulting flame of less heat intensity.

The proximity of the chamber 5, affords a reservoir of heated air, and serves to direct it through the numerous perforations therein to points where it may unite to the best advantage with the fuel jet at the point of combustion. Inasmuch as the entire burner is to be located within the fire box of a cooking range, resting upon the grate bars, the usual drafts of the range may be utilized for regulating the air supply, which of course passes up through the bottom of the base 1, and in contact with the heated metal of the chamber and around the baffle plates 29, and emerges through the several openings at a temperature best suited to properly unite to form an intensely hot flame.

The provision of the deflectors 16 and 17, which are different in structure, is solely for convenience. Occasions arise when an intensely hot flame is desired; the deflector 16, may then be used. At other times when a less heat is required the deflector 17 may be used.

In order that the flame may be evenly distributed, it is necessary that the deflectors be properly centered over the jet openings 15; otherwise the flame is irregular and not of a proper mixture. The notched projections 30 are provided in the pipe 11, so as to insure the proper location of the deflectors 16 and 17.

In starting the burner, the valve (not shown) in the fuel pipe F, is opened and a small amount of the fuel allowed to drip from the openings 15 into the pans 2. It is then ignited and burns up, giving off sufficient heat to heat up the pipe 11, whereupon the fuel therein becomes vaporized and emerges thereafter from the openings 15 in the form of a fine vapor which is ignited and projected in a jet against the deflectors, with the results above described. It only requires a few moments to "kindle the fire", and it will burn thereafter so long as the fuel supply lasts.

Under many conditions a downwardly projected jet of flame will unite with and form a more perfect mixture and consequently a more intense heat than an upwardly projected flame. In Figs. 7 to 14, I have shown a modified form of burner for utilizing the downwardly projected jet. In this form the base 1 and chamber 5 are in all respects the same as those hitherto described.

The fuel pipe 11' extends from the supply through the slot 9, and notches 10 and is bent upwardly and horizontally as at 31 and 32, with its free end provided with a T as at 33, from which branches 34, 35 extend horizontally and terminate in the burner heads 36, 37. Within the branches 34 and 35, are the two small branch pipes 38 and 39, connected by the T 40 to the section 32; the branch pipes extend somewhat into the heads 36, 37, into which they open and from which the fuel may escape by means of the jet openings 41. Extending into the branches 38 and 39, are the small rods 42, 43, passing through the packing glands 44, 45, and provided with the crank bends 46, within the heads 36, 37 and the cranks 47, 48, outside of the gland. Connected to the crank bends 46 are the clearing needles 49, which are guided respectively by the spider 50, and the socket in the plug 51. The point of the needle may be projected into the jet opening 41, or withdrawn therefrom, to clear the same from any obstruction. The pipe structure is clamped to the chamber 5, by the clamps 12, in exactly the same manner as hitherto described in connection with the other form of my invention.

The jet openings 41, in the burner heads are directly over the large openings 8 of the chamber 5. Over said openings I place the deflectors 52, shown in detail in Figs. 12, 13, and 14. They consist of castings of general disk form, having a central conical projection 53 with the circumference slashed as at 54. In order that it may be properly centered, the deflector is provided with the notches 55, which rest upon the pipe 11'. Openings 56 are provided in the walls of the projection for the outlet of air.

In order to afford a supply of heated air to mix with the fuel as it emerges from the jet openings 41, I mount upon the chamber 5, over the openings 7, the inverted U-shaped tubular air conductors 57, each of which is provided with a central socket 58 which surrounds the lower part of the burner heads 36, 37, in such a manner that the conductor presents an opening on each side of the jet opening 41, for the access of a current of heated air coming from the chamber 5, and rising through the conductors 57. These currents of air are maintained by a sort of injector effect of the jet of gas that comes from the opening 41. Inasmuch as the flaming jet is projected downwardly the chamber 5 is kept very hot and the air therein is correspondingly heated. In some cases I may provide what I term as a jacket chamber for the chamber 5. This consists of a pair of flanged plates 59, set upon the upper face of the chamber 5, and provided with numerous perforations as shown; the flanges 60 of the plates 59, raise the plates slightly from the top of the chamber 5, leaving a space in which the heated air is retained in a sort of sluggish circulation.

This form of burner is "kindled" the same as the one first described, and when in operation the jets are projected downwardly and are spread out over the top of the chamber 5, by the deflectors 52. The heated air in said chamber rises through the tubular conductors 57, and mixes with the fuel vapor as it comes from the openings 41, thereby giving a blue flame of very intense heat.

It is well known that in order to form a proper mixture of air and hydro-carbon gas to produce intense heat, the air must be heated to a temperature as nearly as possible to that of the flame itself. By the structure described I am enabled to do this to the very best advantage. Such a mixture is also made to the best advantage where the fuel jet is projected downwardly into a heated chamber, or against a deflector such as I have described. From my tests it would appear that the real chemical action which produces the intensest heat takes place at the point where the motion of the gas is arrested as at the deflector. By breaking up the jet into numerous pencils of flame the heated air has opportunity for more intimate contact with the gas and consequently more perfect combustion; so much so that the objectionable accumulation of soot or unconsumed carbon is completely obviated.

I claim:

1. In a liquid fuel burner, the combination of a fuel pipe having a return bend therein, an air chamber having a perforated top to which said pipe is rigidly secured, a fuel escape orifice adjacent to the end of said pipe, a deflector located upon the top of said air chamber and beneath said orifice, means in said deflector for admitting heated air therethrough from said chamber to unite with a flaming fuel jet from said orifice and thereby aid combustion.

2. In a liquid fuel burner, the combination of an air chamber having a perforated top with a longitudinal slot therein, a pipe leading from a source of liquid fuel supply, and rigidly held in said slot, said pipe having a return bend therein, branch pipes leading from the extremity of said return bend and lying in the plane of said fuel pipe, fuel escape orifices at the extremities of said branch pipes, directed toward said fuel pipe and said perforated top, deflector plates supported upon said fuel pipe in front of said orifices, whereby flaming jets therefrom are spread laterally over the surface of said perforated top, to unite with the heated air passing therethrough from said chamber and thereby aid combustion.

3. In a liquid fuel burner, the combination of an air chamber having a longitudinal slot in the top thereof, a fuel pipe rigidly secured to said top and lying in said slot, an enlarged opening in said top, a return bend in said pipe, a burner head secured to the extremity of said pipe, a fuel escape orifice in said head directed toward said enlarged opening, a deflector plate supported upon said pipe and covering said opening for spreading a flaming jet from said orifice laterally over the surface of said chamber top.

4. In a liquid fuel burner, the combination of a fuel pipe having a return bend therein, an air chamber having a perforated top to which said pipe is rigidly secured, a fuel escape orifice adjacent to the end of said pipe, a deflector located upon the top of said air chamber and beneath said orifice, means in said deflector for admitting heated air therethrough from said chamber to unite with a flaming fuel jet from said orifice and thereby aid combustion, and means for conducting heated air from said chamber to a point adjacent to said orifice.

5. In a liquid fuel burner, the combination of an air chamber having a perforated top with a longitudinal slot therein, a pipe leading from a source of liquid fuel supply, and rigidly held in said slot, said pipe having a return bend therein, branch pipes leading from the extremity of said return bend and lying in the plane of said fuel pipe, fuel escape orifices at the extremities of said branch pipes, directed toward said fuel pipe and said perforated top, deflector plates supported upon said fuel pipe in front of said orifices, whereby flaming jets therefrom are spread laterally over the surface of said perforated top, to unite with the heated air passing therethrough from said chamber and thereby aid combustion, and means for conducting heated air from said chamber to a point adjacent to said orifice.

6. In a liquid fuel burner, the combination of an air chamber having a longitudinal slot in the top thereof, a fuel pipe rigidly secured to said top and lying in said slot, an enlarged opening in said top, a return bend in said pipe, a burner head secured to the extremity of said pipe, a fuel escape orifice in said head directed toward said enlarged opening, a deflector plate supported upon said pipe and covering said opening for spreading a flaming jet from said orifice laterally over the surface of said chamber top, and means for conducting heated air from said chamber to a point adjacent to said orifice.

THOMAS B. FERGUSON.